United States Patent [19]

Mandella et al.

[11] 4,302,524

[45] Nov. 24, 1981

[54] VESICULAR FILM ELEMENTS

[75] Inventors: William L. Mandella, Boonton; James R. Kuszewski, Warren, both of N.J.

[73] Assignee: GAF Corporation, New York, N.Y.

[21] Appl. No.: 131,350

[22] Filed: Mar. 19, 1980

[51] Int. Cl.$^3$ .......................... G03C 1/60; G03C 1/76
[52] U.S. Cl. ..................................... 430/155; 430/152; 430/176; 430/192; 430/197; 430/271; 430/280; 430/290
[58] Field of Search ............... 430/176, 155, 280, 271, 430/152, 290, 192, 197

[56] References Cited

U.S. PATENT DOCUMENTS

| | | | |
|---|---|---|---|
| 3,552,965 | 1/1971 | Notley et al. | 430/152 |
| 3,615,491 | 10/1971 | Weyde | 430/290 |
| 3,622,333 | 11/1971 | Cope | 430/152 |
| 3,708,296 | 1/1973 | Schlesinger | 430/280 |
| 3,817,845 | 6/1974 | Feinberg | 430/280 |
| 3,960,684 | 6/1976 | Feinberg | 430/176 |
| 4,032,518 | 6/1977 | Kotlarchik et al. | 430/152 |

*Primary Examiner*—Charles L. Bowers, Jr.
*Attorney, Agent, or Firm*—James Magee, Jr.

[57] ABSTRACT

A light-sensitive vesicular imaging composition comprising a vesiculating agent which liberates gas upon exposure to activating radiation and a matrix which is a novolac branched epoxy resin of a bis-glycidyl ether and a dihydric phenol.

4 Claims, No Drawings

VESICULAR FILM ELEMENTS

This invention is directed to vesicular imaging films and, more particularly, to the use of branched epoxy resins as the matrix or vehicle binder for a vesicular film coating composition containing a vesiculating agent and to a new branched epoxy resin particularly suitable for use as a matrix for a vesicular composition.

BACKGROUND OF THE INVENTION

Vesicular images are formed in a photographic film by refraction of light from small bubbles or vesicles of gas which is formed and trapped in those areas of the film exposed to light and thereafter developed. Generally, the film has a colloid or resinous coating which carries the light-sensitive vesiculating agent and is coated on a photographic film or substrate. The light-sensitive vesiculating agent is sometimes referred to as a sensitizer and the most commonly employed sensitizers are diazo-compounds which, upon exposure to light, generate nitrogen gas. The gas does not form vesicles immediately but does so when the film is thermally developed by heating, thus allowing the microdispersed gaseous material to coalesce and form the bubbles. The resulting vesicles or bubbles in the exposed area make the matrix opaque to the transmission of light in such areas.

One of the essential performances influencing elements of a vesicular film is the resin binder, often described as the vehicle, or matrix in which the sensitizer or vesiculating agent is dispersed and within which the vesicles are formed upon exposure and development. The resin matrix must have certain characteristics of gas permeability, for the formation of the vehicles and chemical and physical stability after formation. In general, a low diffusion constant is needed to allow fermentation of the vesicles and an effective glass transition temperature which is high enough to avoid distortion of the unexposed areas or collapse of the vesicles in the reader due to the heat generated therein during operation. In general, an effective glass transition temperature of about 80° to 85° C. is satisfactory for most reader apparatus in general use.

In addition, the resin binder or matrix must be compatible with the film base or substrate, the other components of the coating composition, e.g., nucleating agents, and the coating equipment to be used in laying a smooth, even coating of uniform thickness and appearance.

Many resin compositions are known for use as the binder or vehicle for coating a film composition containing a vesiculating agent. Vesicular imaging materials, including films, are of extreme importance in information storage and retrival because of the extremely stable character of the image. Vesiculating compositions and agents are well known in the art. Early commercial vesicular compositions containing a vesiculating agent were originally formulated with gelatin as the binder material. Ultimately, gelatin was replaced with improved binder materials which did not exhibit the undesirable tendency of gelatin to absorb moisture from the atmosphere causing loss of image due to collapse of the vesicles. Typical improved materials include a variety of synthetic polymers such as polyvinyl chloride, polyvinylidene chloride, polystyrene, and copolymers obtained by copolymerizing acrylonitrile with a vinyl chloride, styrene, vinylidene chloro-fluoride, and the like.

To be suitable for use as a vesiculating binder or matrix, a material must be sparingly permeable to the vesiculating gas, usually nitrogen. This is necessary in order to properly form the vesicles as the gas is released by the light-sensitive vesiculating agent. To assist in the proper formation of the vesicles, various nucleating agents such as stearic acid have been employed to increase the speed and occasionally decrease the contrast.

Patents relating generally to vesicular elements include U.S. Pat. Nos. 3,779,774; 2,699,392; 2,703,756; and 3,149,971.

It is an object of this invention to provide improved vesicular film elements and vesicular compositions for the making of such elements.

Another object of the invention is to provide an improved binder resin suitable for use as the photographic matrix in vesicular films.

DESCRIPTION OF THE INVENTION

The objects of this invention are achieved by providing a vesicular film composition comprising a branched thermoplastic epoxy binder resin within which the vesiculating agent and other components of the film composition are contained. The resins used as a vehicle described herein are extremely stable, both chemically and thermally, and have glass transition temperatures such that the vesicles which constitute the developed image are stable over a wide range of temperatures, thus providing archival permanence to the image.

All thermoplastic branched epoxy resins of the indicated type are contemplated for use in the formulations of this invention provided that they have a nitrogen diffusion or coefficient which permits internal formation of the record image defining bubbles of nitrogen liberated within the binder when the vesiculating agent is exposed to radiation and developed. It is understood in the art that a vehicle having such characteristics will necessarily have the type of permeability which allows the film to be fixed and residual nitrogen liberated. The epoxy resins of this invention are significantly different from the well known casting and encapsulating cross-linked epoxy resins which are generally thermoset and infusible.

In making a vesicular film element, the vesicular composition comprising the resin vehicle containing the vesiculating agent and other ingredients is formulated and coated on a suitable substrate, e.g., a transparent support. Various materials are well known in the art for use as film supports. Polyesters such as polyethylene terephthalate are well known and, as film substrates, provide suitable physical and chemical properties for use as a substrate which is compatible with the photographic function of the film. Other suitable substrates include the polyolefins such as polyethylene, polypropylene, and copolymers of such olefins with each other or with other unsaturated monomers; polyesters such as the polycarbonates, polyethylene terephthalate and cellulose derivatives such as the diacetate and the triacetate.

Illustrative resin formulations found to provide vesicular films contain from about 0.6 to about 0.95 molar equivalents of the sulfo-diphenol and from about 0.4 to about 0.05 molar equivalents of the phenol-formaldehyde novolac branching agent. In general, the sum of the moles of the phenol-formaldehyde resin and the bisphenol should be approximately equal to the number of moles of glycidyl ether in the resin.

The present invention is based upon the discovery that a branched epoxy resin, as hereafter described in more detail, provides a vesicular matrix of highly suitable characteristics, particularly with respect to gas permeability and effective glass transition temperature.

The polymer of this invention can be described as a branched epoxy resin comprising units of a bis-glycidyl ether, a polyfunctional bis-sulfophenol and a phenol-formaldehyde novolac. It will be appreciated that the basic polymer chain is provided by copolymerization of the sulfur-containing monomer such as 4,4'-diphenol sulfoxide or 4,4'-diphenol sulfone and the glycidyl ether, e.g., resorcinol glycidyl ether. Branching is provided by inclusion in the resin reaction mixture of an effective amount of a branching agent, such as phenol-formaldehyde novolac resin. The amount of such agent needed will depend upon the desired characteristics of the final film. In general, the term "branched" is intended to describe a structure which is substantially nonlinear, i.e., it is characterized by significant degree of branched polymer chains which may be actually cross-linked in varying degrees to other chains. The term "branched" refers to a polymer chain, the linearity of which has been, to some degree, eliminated or destroyed by the presence of side chains with or without cross-linking.

The preferred vesicular matrix polymers of the invention are copolymers of resorcinol bisglycidyl ether, bis sulfo-diphenol, and phenol-formaldehyde novolac. The structures of these compounds are shown as formulas, I, II and III below.

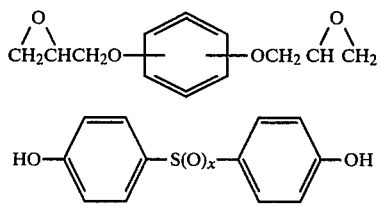
I.

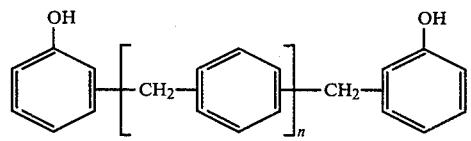
II.

where x is 1 or 2.

OH                  OH    III.

where n can be from 1 to about 10, preferably from 2 to about 4.

The resinous matrix for the vesicular composition can be prepared by polymerization techniques well known in the polymer art. In general, the components of the polymer are reacted in a reaction vessel containing a suitable solvent such as monoethylether of ethylene glycol, dimethyl sulfoxide, dimethyl formamide, N-methylpyrrolidone, or the like, to which is added the desired amount of the glycidyl ether and from 0.6 to 0.95 molar equivalents of the polyfunctional sulfobisphenol compound and from 0.5 to 0.05 molar equivalents of the phenol-formaldehyde novolac branching agent. The reaction is catalyzed by sufficient amount of sodium hydroxide to facilitate condensation at a reasonable rate. The rate of reaction and the degree of polymerization can be varied and controlled to adjustment of the amount of solvent, adjustment of the temperature, partial neutralization of the catalyst, and other techniques well known in the batch polymerization art. In general, the reaction is carried out at a temperature from about 100° C. up to the reflux temperature of the reaction mixture.

The solvent-reactant admixture can vary over a relatively wide range of compositions. For example, the amount of solids in the reaction mixture can be varied from approximately 10% by weight to about 90% by weight, depending upon the type of equipment and the reaction conditions.

The reaction is terminated, for example, by neutralization of the catalyst when the polymerization has progressed to the point at which a polymer suitable for use as a vesicular coating composition has been obtained. The exact viscosity or degree of polymerization is dependent upon many factors, particularly upon the coating perimeters of the equipment which will be used to formulate the ultimate vesicular film element. In general, final viscosities of from about 100 to about 5,000 centipoise have been found to provide polymers suitable for use in this invention.

In preparing the vesicular image elements of this invention, the resin matrix is generally dissolved in some suitable solvent. The light-sensitive vesiculating agent is also dissolved in a suitable solvent or solvent mixture. The two solutions can then be combined and coated by conventional coating techniques onto any suitable supporting material such as are commonly employed in the photographic industry. After drying, to remove the solvent, the resulting film can be exposed to light and developed by dry heating to produce a photoimage which is stable at elevated temperatures and resists loss of clarity with aging. The film is further characterized with a permeability constant within generally accepted ranges and an improved degree of stability with respect to heat-chemical deterioration, scratch resistance, and the like. Additional thermal stability can be imparted to the vesicular film element by incorporating in the coating composition hardening or cross-linking agents such as urea or melamine formaldehyde resins.

The light-sensitive agent or sensitizer used should be one that is non-reactive with the resin vehicle and should be decomposable with the formation of nitrogen gas upon exposure to light. Suitable vesiculating agents include a wide variety of diazo-compounds which liberate nitrogen upon exposure to light such as the quinonediazides, azides, carbazide compound described in U.S. Pat. No. 3,143,418 and conventional diazo-compounds such as those mentioned in U.S. Pat. No. 3,779,768.

While the vesicular compositions of the present invention can, in some cases, be prepared and used in the unsupported form, it is preferred that the vesiculating composition be coated upon and supported by some suitable substrate material. The substrate or support material may be transparent or opaque. A wide variety of suitable photographic support materials are well known. Illustrative supporting substrates include glass, ethyl cellulose, polyesters such as oriented polyethylene terephthalate, the only proviso is that the support material must be capable of withstanding the operational temperatures encountered in the development and projection of vesicular images.

Opaque supports such as paper or synthetic sheet material can be used. For certain purposes, black supports are particularly suitable since the vesicles or bubbles appear as white images upon such black backgrounds so that a positive image is produced directly.

The following examples illustrate the benefits derived from the use of a branched epoxy resin as a matrix compared to the use of an unbranched or linear epoxy resin matrix.

EXAMPLE 1

Into a flask fitted with stirrer, thermometer, reflux condenser, and nitrogen inlet tube, were placed 60 ml. methyl cellosolve, 36.7 g. (0.3136 equivalent) thiodiphenol sulfoxide and 1.6 g. (0.0064 equivalent) thiodiphenol sulfoxide monosodium salt. The mixture was brought to reflux and 40.5 g. (0.32 equivalent) Ciba-Geigy ERE 1359 resorcinol bisglycidyl ether was added, over a period of ½ hour. The mixture was refluxed for an additional 1¼ hours, cooled, and poured into a blender containing 1 l. isopropyl alcohol, 3.4 g. phosphonic acid, and 7 ml. water. The precipitated polymer was redissolved in 70 ml. warm methyl cellosolve and reprecipitated by pouring into 1 l. isopropyl alcohol in the blender. The polymer was collected and dried in a vacuum oven at 60° C.

A coating solution was prepared from this polymer, a diazo-compound and conventional stabilizers, coating aids and a dye. This solution was coated onto a sheet of polyester by means of a #24 Mayer rod. The coating was dried in a forced-air circulation oven for 3 minutes at 115° C. The coated film was exposed for 40 seconds on a Nu Arc Ultra Plus Platemaker, through a Kodak #3 Photographic Step Tablet. The exposed film, upon attempted development by passing through a Canon Nal-Developer 360 VS set at 260° F. development temperature, stuck in the developer and the vesicular image was thereby destroyed.

EXAMPLE 2

The polymer preparation of Example 1 was repeated, except that the amount of resorcinol bisglycidyl ether was reduced to 38.6 g. (0.304 equivalent) and 3.6 g. (0.016 equivalent) Ciba-Geigy ECN-1273 epoxy cresol novolac was added to the reaction mixture. The polymer was isolated, coated, and printed as in Example 1. The coating did not stick in the developer at 260° F. and the stepwedge print had the following projection densities:

| Step: | 0 | 1 | 2 | 3 | 4 | 5 | 6 | 7 |
|---|---|---|---|---|---|---|---|---|
| Density: | 2.34 | 2.39 | 2.43 | 2.37 | 2.19 | 1.82 | 0.20 | 0.18 |

EXAMPLE 3

A reaction flask equipped with heating mantle, stirrer, thermometer, reflux condenser, addition funnel, and nitrogen inlet. The flask was charged with 360 g. methyl cellosolve and the vessel was purged with nitrogen. Sulfonyldiphenol (63.75 g.), phenol-formaldehyde novolac resin (9.55 g.), resorcinol bisglycidyl ether (76.60 g.) and aqueous sodium hydroxide (1.97 g. of 29% solution) were added, and the mixture is heated at 120° C. for 2 hours. A solution of p-tolunesulfonic acid (1.19 g.) in methyl cellosolve (20 g.) is added, and heating is continued at 120° C. for 1 hour. Methyl cellosolve (394 g.) was then added over a period of 1 hour at 120° C. Heating was continued for another 2 hours at 120° C., whereupon a solution of p-toluenesulfonic acid (1.46 g.) in methyl cellosolve (10 g.) is added, and the solution is cooled to room temperature.

EXAMPLE 4

A resin solution prepared as described above (100 g.) was mixed with 4-morpholino-2,5-diethoxybenzenediazonium fluoborate (1.0 g.) and coated on 4 mil. polyester film with a Mayer rod. The coating was dried for 1 minute in a circulating air oven at 123° C. Thickness of the dried layer is approximately 5 micrometers.

The coated film was exposed to a source of ultraviolet light (Nu Arc Platemaker) for 40 seconds and developed by passage through a Canon Nal-Developer to give a dense vesicular image.

If desired, additives and adjuvants, such as coating aids, dyes, stabilizers, surfactants, and treatment with hot water, may be used in preparing coatings.

EXAMPLE 5

A resin solution was prepared as described above, except that the ratio of reactants was:
 0.90 equivalent sulfonyldiphenol
 0.10 equivalent phenol-formaldehyde novolac resin
 1.00 equivalent resorcinol bisglycidyl ether The resin was coated as before and a print was prepared as before. The projection densities of the print were as follows:

| Step: | 0 | 1 | 2 | 3 | 4 | 5 | 6 | 7 | 8 |
|---|---|---|---|---|---|---|---|---|---|
| Density: | 2.40 | 2.40 | 2.37 | 2.34 | 2.23 | 1.82 | 0.47 | 0.17 | 0.16 |

EXAMPLE 6

A resin was prepared as described above, except that the ratio of reactants was: 0.65 equivalent sulfonyldiphenol, 0.35 equivalent phenol-formaldehyde novolac resin and 1.00 equivalent resorcinol bisglycidyl ether. For coating, the following ingredients were mixed: 1.9 g. resin, 16.3 g. methyl cellosolve, 0.1 g. Saran resin, 0.02 g. citric acid, 0.006 g. Union Carbide L-7001 silicone, 0.01 g. blue dye, 0.02 g. thiourea and 0.11 g. 4-morpholino-2,5-diethoxybenzenediazonium fluoborate.

This solution is coated on 4 mil polyester film to a dry thickness of approximately 5 micrometers. The coating is dried 1 minute in a circulating air oven at 123° C.

The coated film is exposed for 40 seconds in a Nu Arc Platemaker, through a Kodak Photographic Step Tablet No. 3, then developed by passing through a Canon Kal-Developer to give a vesicular image. The projection densities, determined on a MacBeth TD-528 densitometer, were as follows:

| Step: | 0 | 1 | 2 | 3 | 4 | 5 | 6 | 7 |
|---|---|---|---|---|---|---|---|---|
| Density: | 2.43 | 2.45 | 2.46 | 2.42 | 2.35 | 2.02 | 0.16 | 0.15 |

In addition to the matrix resin and the vesiculating agent, the coating composition may contain anti-blocking agents such as polyethylene beads, silica and the like; speed improving agents such as stearic acid or the like; adhesion promoters such as polyvinylidene copolymers, stabilizers such as citric acid; coating aids to prevent dry spots and peeling, dyes to color the unexposed areas of the image element; and other compatible ingredients.

What is claimed is:

1. An imaging film element for formation of a vesicular image, comprising a film support and coated on said support, a composition comprising a binder and an imaging amount of a photosensitive vesiculating agent capable of generating nitrogen gas upon exposure to radiation dispersed therein, said binder being a substantially branched film-forming epoxy resin copolymer of a bis-glycidyl ether, a sulfur containing diphenol of the formula

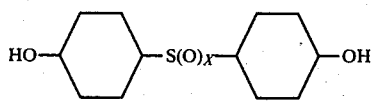

wherein X is 1 or 2.

2. The element of claim 1 wherein the binder is a copolymer of resorcinol bis-glycidyl ether and from about 0.6 to 0.95 moles of bis 4,4'-sulfonyl diphenol per mole of glycidyl ether and from about 0.4 to 0.05 moles of phenol formaldehyde novolac per mole of glycidyl ether.

3. The element according to claim 1 wherein said binder is prepared from resorcinol bis-glycidyl ether, bis 4,4' sulfonyl diphenol and phenol-formaldehyde novolac in a molar ratio of about 1 to 0.85 to 0.15.

4. In a vesicular film, and improved binder for the vesiculating agent comprising a substantially branched epoxy resin consisting essentially of resorcinol bis-glycidyl ether, bis 4,4' sulfonyl diphenol, and a phenol-formaldehyde novolac.

* * * * *